United States Patent
Takagi et al.

(10) Patent No.: US 8,541,092 B2
(45) Date of Patent: Sep. 24, 2013

(54) BONDED HONEYCOMB SEGMENT ASSEMBLY

(75) Inventors: Tomoyuki Takagi, Nagoya (JP); Reiji Matsubara, Aichi-Gun (JP)

(73) Assignee: NGK Insulators, Ltd., Nagoya (JP)

( * ) Notice: Subject to any disclaimer, the term of this patent is extended or adjusted under 35 U.S.C. 154(b) by 265 days.

(21) Appl. No.: 12/731,552

(22) Filed: Mar. 25, 2010

(65) Prior Publication Data

US 2010/0247854 A1 Sep. 30, 2010

(30) Foreign Application Priority Data

Mar. 30, 2009 (JP) ................... 2009-082561

(51) Int. Cl.
*B32B 3/12* (2006.01)

(52) U.S. Cl.
USPC .......................................... 428/116

(58) Field of Classification Search
None
See application file for complete search history.

(56) References Cited

U.S. PATENT DOCUMENTS

| 4,335,783 | A | 6/1982 | McBrayer et al. |
|---|---|---|---|
| 2002/0197193 | A1 | 12/2002 | Harada et al. |
| 2004/0045267 | A1* | 3/2004 | Ichikawa et al. ............ 55/523 |
| 2008/0152863 | A1 | 6/2008 | Tomita et al. |
| 2008/0241501 | A1* | 10/2008 | Ohno et al. ............ 428/305.5 |
| 2009/0130378 | A1* | 5/2009 | Imaeda et al. ............ 428/116 |
| 2009/0208700 | A1* | 8/2009 | Ohno et al. ............ 428/116 |

FOREIGN PATENT DOCUMENTS

| EP | 1 437 168 A1 | 7/2004 |
|---|---|---|
| EP | 2 062 636 A1 | 5/2009 |
| EP | 2 090 559 A1 | 8/2009 |
| JP | 2001-190916 A1 | 7/2001 |
| JP | 2004-188278 A1 | 7/2004 |
| JP | 2008-179526 A1 | 8/2008 |

OTHER PUBLICATIONS

William Pabst, A cross-property relation between the tensile modulus and the terminal conductivity of porous material; Dept. Galss and Ceramics, Institute of Chemical Technology in Prague. Sep. 19, 2005.*
INSTRON, "Proportional Limit", Glossary of Materials Testing, 2012.*
INSTRON, "Tensile Modulus of Elasticity", Glossary of Materials Testing, 2012.*

* cited by examiner

*Primary Examiner* — David Sample
(74) *Attorney, Agent, or Firm* — Burr & Brown

(57) ABSTRACT

A bonded honeycomb segment assembly has plurality of honeycomb segments each including cell structure having plurality of cells as fluid passages partitioned by porous partition walls and provided in parallel with one another, and outer wall provided in the outer periphery of the cell structure. The outer wall of each of the plurality of honeycomb segments is bonded to one another via bonding layers. Relation of $M_1 < M_2$ is satisfied in which $M_1$ is compressive Young's modulus in thickness direction of the bonding layers positioned in the vicinity of gravity point in cross section of the bonded honeycomb segment assembly perpendicular to the fluid passage direction of the cells, and $M_2$ is compressive Young's modulus in the thickness direction of the bonding layers bonding the outer wall of each of the plurality of honeycomb segments positioned in the outermost periphery of the bonded honeycomb segment assembly.

3 Claims, 3 Drawing Sheets

BONDED HONEYCOMB SEGMENT ASSEMBLY

BACKGROUND OF THE INVENTION

1. Field of the Invention

The present invention relates to a bonded honeycomb segment assembly. More particularly, it relates to a bonded honeycomb segment assembly which is excellent in thermal shock resistance.

2. Description of the Related Art

As a collecting filter for an exhaust gas, for example, as a diesel particulate filter (hereinafter referred to also as "DPF") for collecting and removing a particulate material (hereinafter referred to also as "PM") included in an exhaust gas from a diesel engine or the like, a honeycomb structure is broadly used.

Such a honeycomb structure usually has a constitution in which a plurality of cells as fluid passages partitioned by porous partition walls made of silicon carbide (SiC) or the like are provided in parallel with one another in the fluid passage direction. Moreover, the ends of the adjacent cells are alternately plugged so as to form a checkered pattern. That is, one cell has one end opened and the other end plugged, and another cell adjacent to this cell has one end plugged and the other end plugged.

The cells are plugged in this manner, whereby the exhaust gas flows into a predetermined cell (an inflow cell) from one end thereof, passes through the porous partition wall, and is discharged through a cell (an outflow cell) adjacent to the inflow cell. When the exhaust gas passes through the partition walls, the PM in the exhaust gas is collected by the partition walls, whereby the exhaust gas is purified.

To use such a honeycomb structure continuously for a long period of time, the structure needs to be periodically subjected to a regeneration treatment. That is, to decrease a pressure loss which increases owing to the PM deposited in the filter with an elapse of time and to return the performance of the filter to an initial state, the PM deposited in the filter needs to be burnt and removed. There has been a problem that a large heat stress is generated during the regeneration of the filter, thereby causing defects such as cracking and breakdown in the honeycomb structure. As the honeycomb structure which meets a demand for the improvement of a thermal shock resistance against this heat stress, there is disclosed a honeycomb structure having a divided constitution in which the honeycomb structure is divided into a plurality of honeycomb segments, and the segments are bonded via bonding layers to form a bonded article, thereby imparting a function of scattering and alleviating the heat stress (e.g., see Patent Document 1).

However, in recent years, a demand for improvement of the regeneration margin of the filter has further risen. When the regeneration margin of the filter improves, the amount of the deposited PM before performing the regeneration treatment increases, and hence the heat stress generated during the regeneration also increases. In the disclosed honeycomb structure, the thermal shock resistance does not sufficiently improve. When the improvement of the thermal shock resistance is realized, the bonding layers for integrally bonding the plurality of honeycomb segments require an excellent stress alleviating function and a high bonding strength. As the honeycomb structure for a purpose of the improvement of the thermal shock resistance by such improvement of the bonding layers, another honeycomb structure is disclosed in which the Young's modulus of the material of the bonding layers for bonding the honeycomb segments is set to 20% or less of that of the material of the honeycomb segments (e.g., see Patent Document 2).

Still another honeycomb structure is disclosed in which the Young's modulus of the bonding layers made of a predetermined material is set to 3 GPa or more, thereby suppressing the deformation of bonding members due to a heat strain. Furthermore, the breakdown of the bonding layers due to the stress is suppressed to improve the thermal shock resistance (e.g., see Patent Document 3).

[Patent Document 1] U.S. Pat. No. 4,335,783
[Patent Document 2] JP-A-2001-190916
[Patent Document 3] JP-A-2008-179526

SUMMARY OF THE INVENTION

The present invention has been developed in view of the problems of such conventional technologies, and an object thereof is to provide a bonded honeycomb segment assembly which is excellent in thermal shock resistance.

The present inventors have investigated the influence of the Young's modulus of a bonding layer in each bonding portion with respect to a stress in order to achieve the above object. Consequently, it has been found that around the center of the article where each honeycomb segment is more noticeably deformed, the Young's modulus of the bonding layer is decreased as usual to exhibit a stress decreasing effect and that around an outer peripheral portion of the article where the deformation around the center is received and the stress is concentrated, conversely the Young's modulus is increased to scatter the stress in the adjacent honeycomb segments, so that the stress can further be decreased.

From such finding, it has further been found that the Young's modulus of the bonding layer for bonding the honeycomb segments around the center of the article is decreased, and the Young's modulus of the bonding layer for bonding the honeycomb segments around the outer peripheral portion of the article is increased, whereby the improvement of the stress alleviating function of the bonding layers can further be expected, and hence the thermal shock resistance of the honeycomb structure can further be improved. In consequence, the present invention has been completed.

That is, according to the present invention, a bonded honeycomb segment assembly is provided as follows.

A bonded honeycomb segment assembly comprising: a plurality of honeycomb segments each including a cell structure having a plurality of cells as fluid passages partitioned by porous partition walls and provided in parallel with one another, and an outer wall provided in the outer periphery of the cell structure, wherein the outer wall of each of the plurality of honeycomb segments is bonded to one another via bonding layers, and a compressive Young's modulus $M_1$ in the thickness direction of the bonding layers positioned in the vicinity of a gravity point (i.e., center of gravity) in a cross section of the bonded honeycomb segment assembly perpendicular to the fluid passage direction of the cells, and a compressive Young's modulus $M_2$ in the thickness direction of the bonding layers bonding the outer wall of each of the plurality of honeycomb segments positioned in the outermost periphery of the bonded honeycomb segment assembly satisfy a relation of $M_1 < M_2$.

[2] The bonded honeycomb segment assembly according to the above [1], wherein the compressive Young's modulus $M_1$ and the compressive Young's modulus $M_2$ satisfy a relation of $M_2/M_1 \geq 1.01$.

[3] The bonded honeycomb segment assembly according to the above [1], wherein the compressive Young's modulus $M_1$ and the compressive Young's modulus $M_2$ satisfy a relation of $M_2/M_1 \geq 1.1$.

The bonded honeycomb segment assembly of the present invention has an advantage of being excellent in thermal shock resistance.

DETAILED DESCRIPTION OF THE INVENTION

Hereinafter, an embodiment of the present invention will be described, but it should be understood that the present invention is not limited to the following embodiment and that alteration, modification or the like appropriately added to the following embodiment based on the ordinary knowledge of a person with ordinary skill without departing from the scope of the present invention is also included in the scope of the present invention.

A bonded honeycomb segment assembly of the present invention includes a plurality of honeycomb segments each having a cell structure including a plurality of cells as fluid passages partitioned by porous partition walls and provided in parallel with one another, and an outer wall provided in the outer periphery of the cell structure. The outer wall of each of the plurality of honeycomb segments is bonded to one another via bonding layers. A relation of $M_1<M_2$ is satisfied in which $M_1$ is a compressive Young's modulus in the thickness direction of the bonding layers positioned in the vicinity of a gravity point in the cross section of the bonded honeycomb segment assembly perpendicular to the fluid passage direction of the cells, and $M_2$ is a compressive Young's modulus in the thickness direction of the bonding layers bonding the outer walls of the honeycomb segments positioned in the outermost periphery of the bonded honeycomb segment assembly.

Moreover, the compressive Young's modulus $M_1$ and the compressive Young's modulus $M_2$ satisfy a relation of preferably $M_2/M_1 \geq 1.01$, further preferably $M_2/M_1 \geq 1.1$. When such a relation is satisfied, heat stresses generated in the bonding layers and the honeycomb segments can further be alleviated, and consequently the thermal shock resistance of the bonded honeycomb segment assembly can further be improved.

When the bonded honeycomb segment assembly of the present invention satisfies the above relation, the decrease of the stresses of the bonding layers can be realized. Therefore, the size of the bonded honeycomb segment assembly, the materials and sectional shapes of the cell structure and the partition walls and the like do not influence the decrease of the stresses of the bonding layers, and can arbitrarily be set.

1. Bonded Honeycomb Segment Assembly

Figure 1:
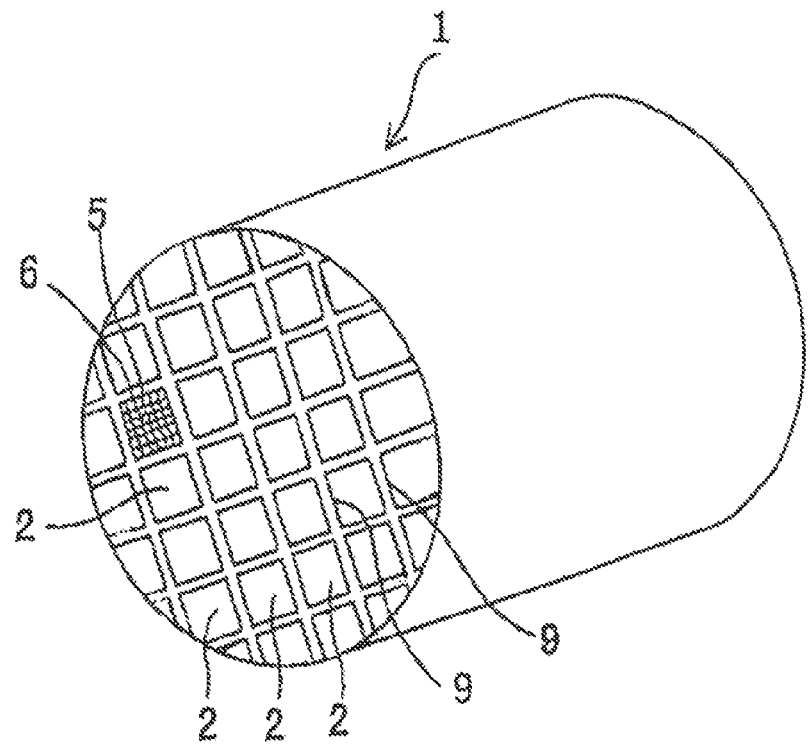
FIG. 1 is a perspective view showing one embodiment of a bonded honeycomb segment assembly of the present invention.

One embodiment of the bonded honeycomb segment assembly of the present invention will be described with reference to the drawings. FIG. 1 is a perspective view showing the embodiment of the bonded honeycomb segment assembly of the present invention. In FIG. 1, a bonded honeycomb segment assembly 1 includes a plurality of honeycomb segments 2 each having a cell structure including a plurality of cells 5 as fluid passages partitioned by porous partition walls 6 and provided in parallel with one another, and an outer wall provided in the outer periphery of the cell structure. The outer walls of the plurality of honeycomb segments 2 are bonded to one another via bonding layers 9. It is to be noted that in FIG. 1, the bonded honeycomb segment assembly 1 has a columnar shape, but the shape of the bonded honeycomb segment assembly of the present invention is not limited to the columnar shape.

There is not any special restriction on the number of the honeycomb segments constituting the bonded honeycomb segment assembly, and the number is usually from about 9 to 100. The bonded honeycomb segment assembly of the present invention has a constitution in which the outer walls of the plurality of honeycomb segments are bonded to one another via the bonding layers, whereby a heat stress is alleviated. Moreover, it is possible to suppress the occurrence of cracking, in a case where the bonded honeycomb segment assembly is exposed to the rapid change of the temperature of an exhaust gas or locally generated heat, and a non-uniform temperature distribution occurs in the article.

Moreover, the outer peripheral portion of the bonded honeycomb segment assembly may be cut or does not have to be cut. When the outer peripheral portion of the article is not cut, for example, honeycomb segments each having the outer shape of the outermost peripheral portion thereof beforehand formed into a finally necessary outer shape may be used. It is to be noted that the presence/absence of the cutting of the outermost peripheral portions of the honeycomb segments does not influence the scope of the present invention.

Furthermore, an outer peripheral coat layer may be provided on the cut outer peripheral surface of the bonded honeycomb segment assembly, or the outer peripheral coat layer does not have to be provided. When the outer peripheral coat layer is not provided, the honeycomb segments each having, for example, the outer shape of the outermost peripheral portion thereof beforehand prepared into the finally necessary outer shape may be used. It is to be noted that the presence/absence of this outer peripheral coat layer does not influence the scope of the present invention.

(1) Honeycomb Segment

Each honeycomb segment includes a cell structure having a plurality of cells as fluid passages partitioned by porous partition walls and provided in parallel with one another, and an outer wall provided in the outer periphery of the cell structure. The plurality of cells partitioned by the porous partition walls connect two end faces of the honeycomb segment.

The material of the honeycomb segment further preferably has an average pore diameter of 5 to 40 μm and a porosity of 30 to 85%. More specifically, it is preferable from the viewpoints of strength and heat resistance to use, as the material, at least one selected from the group consisting of silicon carbide (SiC), a silicon-silicon carbide based composite material using silicon carbide (SiC) as an aggregate and silicon (Si) as a binding agent, silicon nitride, cordierite, mullite, alumina, spinel, a silicon carbide-cordierite based composite material, lithium aluminum silicate, aluminum titanate, and an Fe—Cr—Al based metal. It is to be noted that the average pore diameter is a value measured by a method described in "JASO Automobile Standards, Test Method of Car Exhaust Gas Purifying Catalyst Ceramic Monolith Carrier, Total Pore Volume, Median Pore Diameter described in 6.3 of M505-87", and the porosity is a value measured by a method of calculation from the pore volume.

The plurality of cells as the fluid passages partitioned by porous partition walls and provided in parallel with one another are provided with plugging portions which forms complementary checkered patterns in one end face and the other end face of the honeycomb segment. The cells are provided with such plugging portions, whereby when the exhaust gas flows through a DPF using the bonded honeycomb segment assembly of the present invention, the exhaust gas does not pass through the connected end faces as it is, but has to pass through the partition walls at least once. At this time, a PM included in the exhaust gas is removed.

The temperature of the exhaust gas is raised at an appropriate time or distance interval to burn and remove the PM deposited on the partition walls. For a purpose of burning and removing the PM, a catalyst may or may not be loaded on the porous partition walls constituting the honeycomb segment. When the catalyst is loaded, it is possible to use, as the catalyst, a single material or a compound containing at least one element selected from the group consisting of noble metal elements, elements of Periodic Table 6A and elements of Periodic Table 8. More specifically, examples of the material include the single material or the compound containing at least one element selected from the group consisting of platinum (Pt), palladium (Pd), rhodium (Rh), nickel (Ni), cobalt (Co), molybdenum (Mo), tungsten (W), cerium (Ce), copper (Cu), vanadium (V), iron (Fe), gold (Au) and silver (Ag). Moreover, an NOx selective reduction type catalyst component or an NOx adsorber type catalytic component may be used. When any catalyst is not loaded, a fuel additive such as Ce or Fe is introduced into a fuel, whereby the PM can be burnt by the heat of the exhaust gas owing to the catalytic function of the additive. Moreover, any catalyst or fuel additive may not be used, and the temperature of the exhaust gas can be raised only by engine control to burn the PM. It is to be noted that the presence/absence of this catalyst loading does not influence the scope of the present invention.

Figure 3:
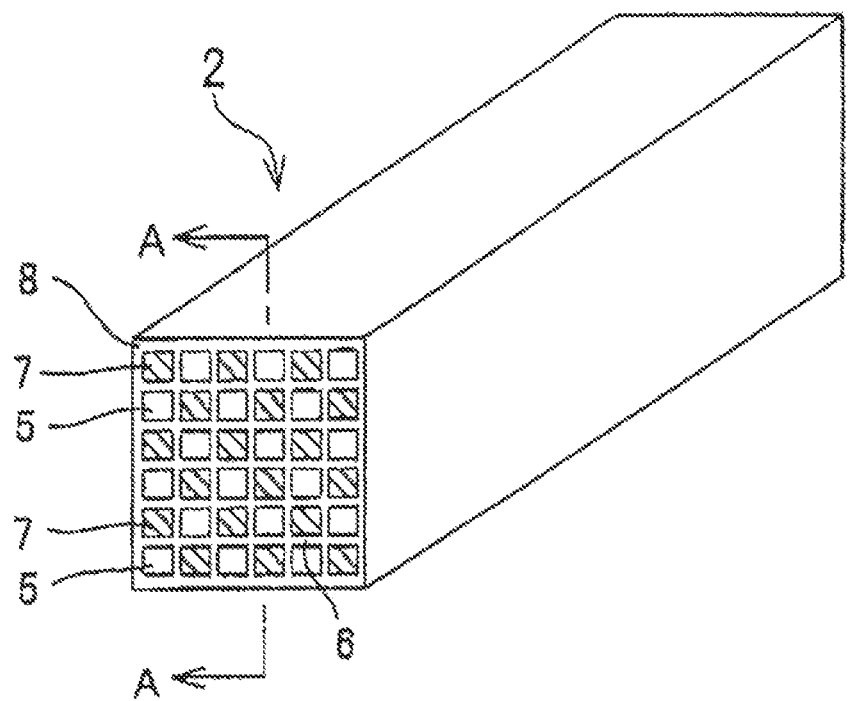
FIG. 3 is a perspective view showing one example of a honeycomb segment constituting the bonded honeycomb segment assembly of the present invention.

Here, the honeycomb segment will be described with reference to the drawing. FIG. 3 is a perspective view showing one example of the honeycomb segment constituting the bonded honeycomb segment assembly of the present invention. The honeycomb segment 2 includes a cell structure having the plurality of cells 5 as fluid passages partitioned by the porous partition walls 6 and provided in parallel with one another, and an outer wall 8 provided in the outer periphery of the cell structure, and the honeycomb segment has a honeycomb shape. Moreover, the cells 5 are provided with plugging portions 7 which form complementary checkered patterns in one end face and the other end face of the honeycomb segment. It is to be noted that in FIG. 3, the shape of the honeycomb segment 2 is a square rod-like shape, but the shape of the honeycomb segment constituting the bonded honeycomb segment assembly of the present invention is not limited to the square rod-like shape, and the shape can appropriately be selected if necessary.

Figure 4:
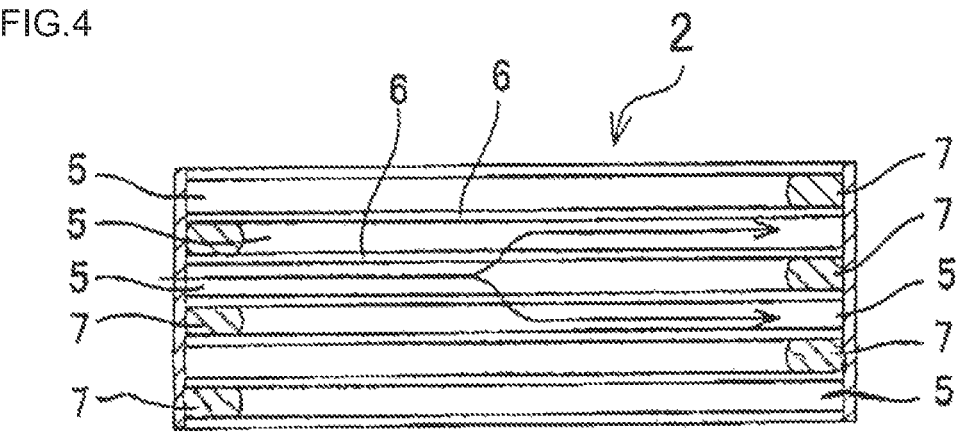
FIG. 4 is a sectional view of the honeycomb segment cut along the A-A line of FIG. 3.

The cells 5 are provided with the plugging portions 7 which form the complementary checkered patterns in one end face and the other end face of the honeycomb segment. As shown in FIG. 4, in a case where the bonded honeycomb segment assembly of the present invention is used as a DPF, the exhaust gas including the PM flows into the cell 5 which is not provided with the plugging portion 7 in the one end face of the honeycomb segment, passes through the porous partition wall 6 at least once, and is then discharged through the cell 5 which is not provided with the plugging portion 7 in the other end face of the honeycomb segment. When the exhaust gas passes through the porous partition walls 6, the PM included in the exhaust gas is removed.

(2) Bonding Layers

Each bonding layer bonds the outer walls of the honeycomb segments to each other. The bonding layer satisfies a relation of $M_1 < M_2$, in which $M_1$ is a compressive Young's modulus in the thickness direction of the bonding layer (hereinafter referred to also as "the bonding layer in the vicinity of the gravity point") positioned in the vicinity of the gravity point in the cross section of the bonded honeycomb segment assembly perpendicular to the fluid passage direction of the cells, and $M_2$ is a compressive Young's modulus in the thickness direction of the bonding layer (hereinafter referred to also as "the outer peripheral bonding layer") bonding the outer walls of the honeycomb segments positioned in the outermost periphery of the bonded honeycomb segment assembly. A relation of preferably $M_2/M_1 \geq 1.01$, further preferably $M_2/M_1 \geq 1.1$ is satisfied.

Figure 2A:
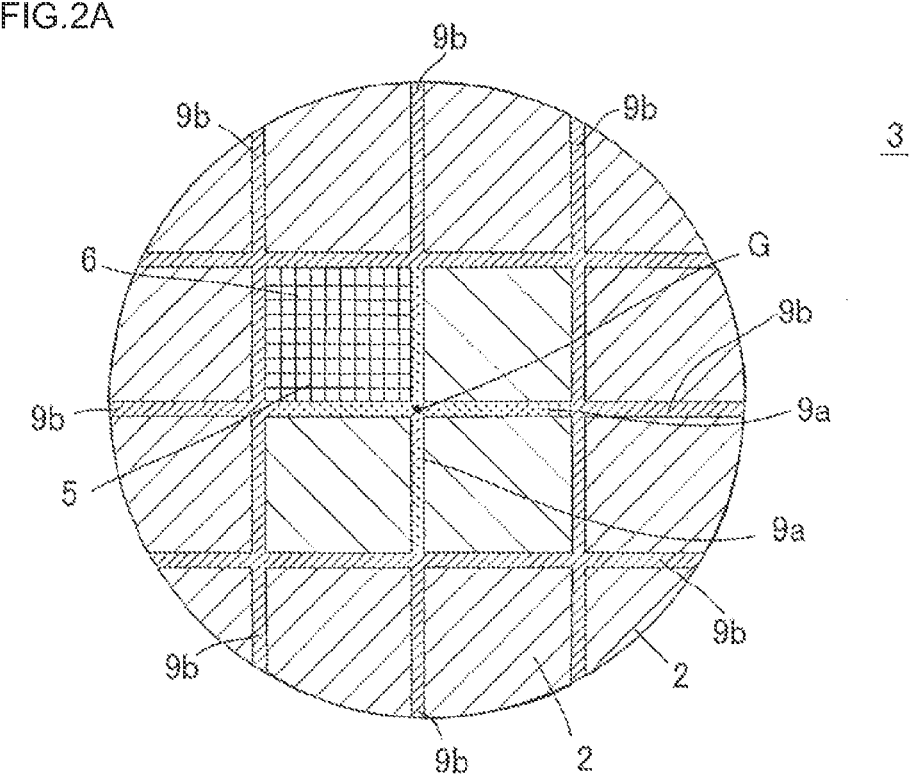
FIG. 2A is a sectional view showing one example of a cross section of a bonded honeycomb segment assembly of the present invention perpendicular to the fluid passage direction of the cells.
Figure 2B:
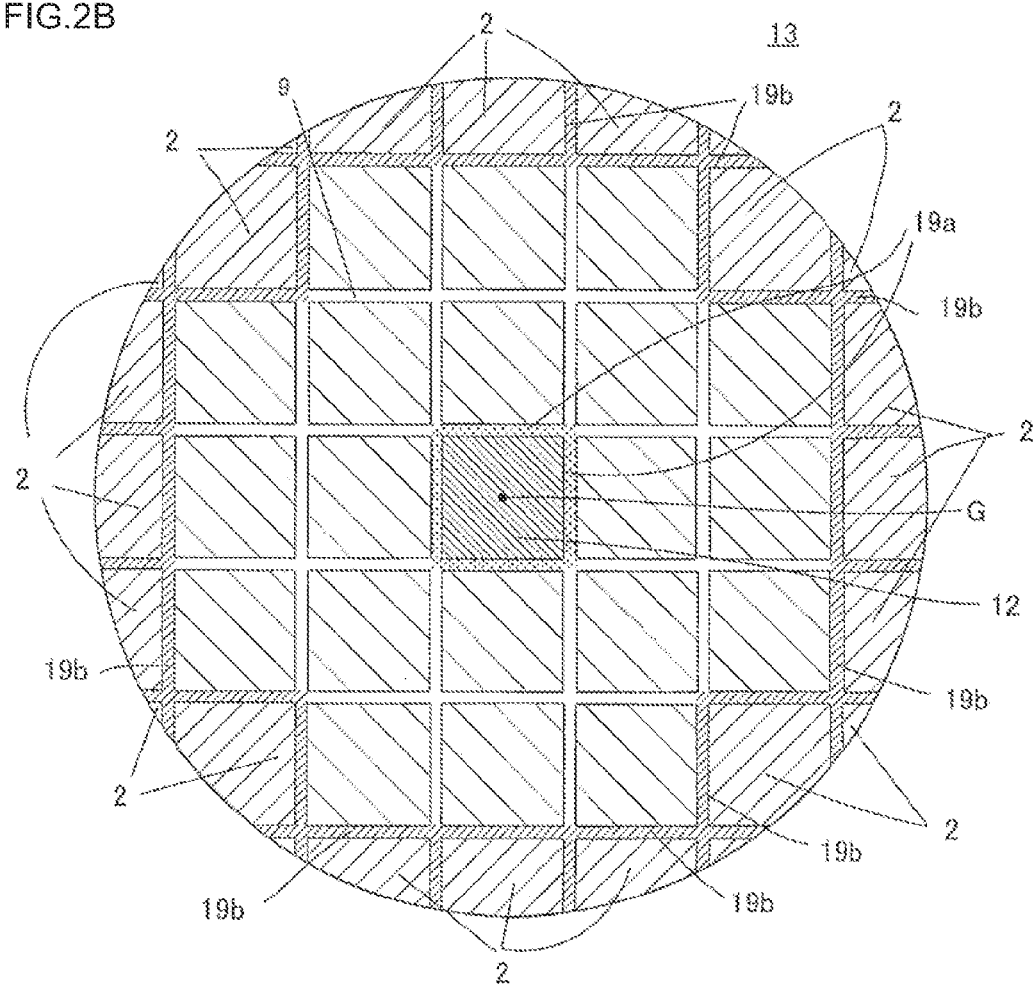
FIG. 2B is a sectional view showing another example of a cross section of a bonded honeycomb segment assembly of the present invention perpendicular to the fluid passage direction of the cells.
Figure 2C:
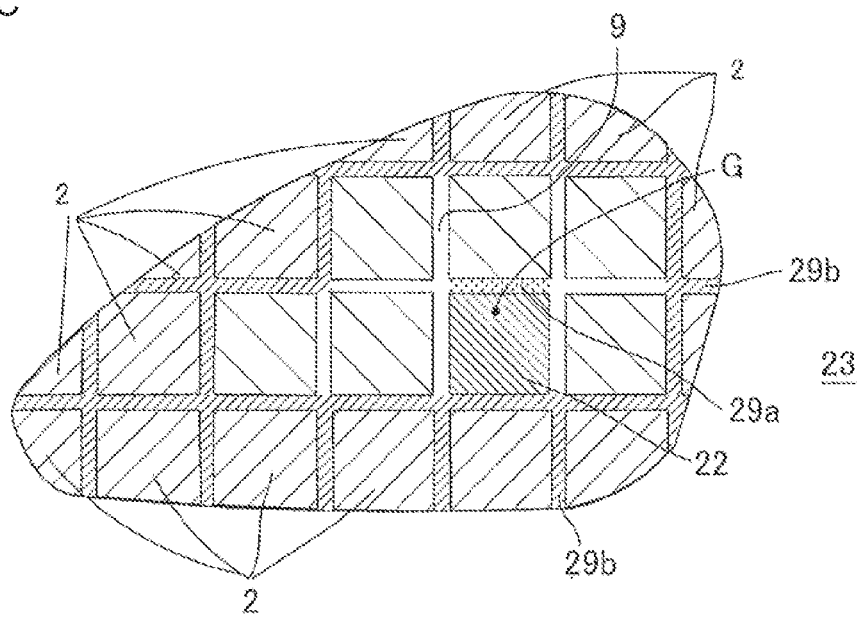
FIG. 2C is a sectional view showing still another example of a cross section of a bonded honeycomb segment assembly of the present invention perpendicular to the fluid passage direction of the cells.

Here, first "the bonding layer positioned in the vicinity of the gravity point in the cross section of the article perpendicular to the fluid passage direction of the cells" will be described with reference to the drawing. FIGS. 2A to 2C are sectional views showing one example of the cross section of the bonded honeycomb segment assembly of the present invention perpendicular to the fluid passage direction of the cells. As shown in FIG. 2A, when a gravity point G of a cross section 3 is positioned on a bonding layer 9a, the bonding layer in the vicinity of the gravity point is the bonding layer 9a including the gravity point G. Moreover, as shown in FIG. 2B, when a gravity point G of a cross section 13 is positioned in the center of a honeycomb segment 12, the bonding layer in the vicinity of the gravity point is a bonding layer 19a bonding the honeycomb segment 12 to another honeycomb segment. Furthermore, as shown in FIG. 2C, when a gravity point G of a cross section 23 is not positioned on a bonding layer 9 or in the center of a honeycomb segment 22, the bonding layer in the vicinity of the gravity point is a bonding layer 29a having the shortest distance from the gravity point G.

Next, "the bonding layer bonding the outer walls of the honeycomb segments positioned in the outermost periphery of the article" will be described with reference to the drawing. As shown in FIGS. 2A to 2C, the outer peripheral bonding layer is a bonding layer 9b, 19b or 29b bonding the honeycomb segments 2 positioned in the outermost periphery of the cross section 3, 13 or 23.

It is to be noted that "the compressive Young's modulus in the thickness direction" may be the compressive Young's modulus measured only in one arbitrary sectional face between both end faces of the article, but is preferably the average value of the compressive Young's modulus values in the thickness direction measured at three points of one cross section in the vicinity of the one end face, another cross section in the vicinity of the other end face and still another cross section in the center between both the end faces. It is to be noted that "the vicinity of the end face" is a position excluding the plugging portion of the end face having a length of about 15 mm to 50 mm from the end face.

The compressive Young's modulus in the thickness direction can be calculated as follows. A sample having a predetermined dimension (from 10×10 mm to 30×30 mm, a thickness of 0.5 to 3 mm) is cut out and subjected to a compression test in the thickness direction. It is to be noted that the sample may be provided with a base material. The compressive Young's modulus in the thickness direction is regarded as a tilt in a stress-strain curve when a load of 0 to 3 MPa is added to the sample, and can be calculated from the following equation.

$$E = W/S \times t/\Delta t, \qquad \text{[Equation 1]}$$

in which E is the compressive Young's modulus (MPa) in the thickness direction, W is the load (N), S is a sample area (mM$_2$), t is a sample thickness (mm), and $\Delta t$ is a variate (mm) of the sample thickness.

The constituent component of the bonding layer usually contains an inorganic fiber, but does not have to contain the inorganic fiber. In addition, the component contains, for example, an inorganic binder, an organic binder, inorganic particles, foam particles or the like sometimes. Specific examples of the inorganic fiber include aluminosilicate, alumina, an oxide fiber of $SiO_2$—MgO, $SiO_2$—CaO—MgO or the like, and another fiber (e.g., an SiC fiber). Moreover, specific examples of the inorganic binder include silica sol, alumina sol and puddle. Furthermore, specific examples of the organic binder include polyvinyl alcohol (PVA), carboxymethylcellulose (CMC) and methylcellulose (MC). In addition, specific examples of the inorganic particles include ceramic particles of silicon carbide, silicon nitride, cordierite, alumina and mullite.

The ratio of these constituent components is varied in the bonding layer in the vicinity of the gravity point and the outer peripheral bonding layer, whereby the rigidity of a bonding material itself, and the porosity and porosity distribution of the bonding material can be varied. In consequence, the compressive Young's modulus in the thickness direction can arbitrarily be varied in the bonding layer in the vicinity of the gravity point and the outer peripheral bonding layer. Moreover, the water content ratio of a bonding material slurry used for forming the bonding layer is varied in the bonding layer in the vicinity of the gravity point and the outer peripheral bonding layer, whereby the compressive Young's modulus in the thickness direction can be varied in the bonding layer in the vicinity of the gravity point and the outer peripheral bonding layer. Here, the bonding layer usually has a function of bonding the honeycomb segments to each other, but even a bonding layer which does not have the bonding function is included in the scope of the present invention, because the stress alleviating functions of the bonding layer and the honeycomb segment can be developed as long as an elastic material between the honeycomb segments has a function of alleviating a heat stress.

There is not any special restriction on the compressive Young's modulus in the thickness direction of the bonding layer, but the modulus is preferably 1.5 GPa or less. If the modulus exceeds 1.5 GPa, the stress given to the adjacent honeycomb segment due to the bulging honeycomb segment cannot sufficiently be alleviated by the bonding layer. In consequence, when the honeycomb segment is used as the DPF, the honeycomb segment adjacent to the honeycomb segment having a bulging high temperature portion might break down owing to a locally excessive temperature rise during regeneration.

There is not any special restriction on a method for manufacturing the bonded honeycomb segment assembly of the present invention, but the article can be manufactured by, for example, a method described in paragraphs 0072 and 0076 of JP-A-2008-162879 by use of the honeycomb segments and the bonding material slurry described in "(1) Honeycomb Segment". Moreover, for example, as to the outer shape of the honeycomb segments constituting the outermost peripheral portion of the article, when the honeycomb segments beforehand prepared so as to have the finally necessary outer shape are used, the outer peripheral portion of the plurality of bonded honeycomb segments does not have to be cut, whereby the bonded honeycomb segment assembly having a desired outer shape can be obtained.

The bonding material slurry can be prepared by adding the organic binder (e.g., methylcellulose, carboxymethylcellulose or the like), a dispersant, water or the like to the constituent component of the bonding layer if necessary, and mixing and kneading the resultant material into a paste state by use of a kneader such as a mixer. It is to be noted that the constituent component of the bonding layer is the constituent component described in the paragraphs of "Bonding Layer".

EXAMPLES

Hereinafter, the present invention will specifically be described with respect to examples, but the present invention is not limited to these examples. It is to be noted that "parts" and "%" in examples and comparative examples are based on masses unless otherwise specified. Moreover, hereinafter, measurement methods of various physical values and evaluation methods of various characteristics will be described.

[Evaluation of Presence/Absence of Cracking]: A soot regeneration test was performed in a diesel engine. While an engine rotation number: 2000 rpm and an engine torque: 90 Nm were kept as test conditions, post injection was started, and stopped when pressure losses before and after a bonded honeycomb segment assembly started to drop down, whereby an engine state was switched to an idle state. The occurrence of cracking in the circumferential direction of the tested bonded honeycomb segment assembly was visually judged. The occurrence of the cracking was evaluated as "present", and a case where any cracking did not occur was evaluated as "absent".

[Maximum Stress (MPa) of bonded honeycomb segment assembly in fluid passage Direction]: In a case where stress analysis was performed on the above soot regeneration test conditions, the maximum stress of the bonded honeycomb segment assembly in the fluid passage direction, which was a cause for the cracking in the circumferential direction of the bonded honeycomb segment assembly, was calculated by a method described in JP-A-2005-242679.

[Stress Decrease Ratio (%)]: In Examples 1 to 6, ratios were calculated on the basis of the maximum stress of a bonded honeycomb segment assembly in the fluid passage direction of Comparative Example 1. In Examples 7 to 12, the ratios were calculated on the basis of the maximum stress of a bonded honeycomb segment assembly in the fluid passage direction of Comparative Example 2. In Examples 13 to 18, the ratios were calculated on the basis of the maximum stress of a bonded honeycomb segment assembly in the fluid passage direction of Comparative Example 3. In Examples 19 to 24, the ratios were calculated on the basis of the maximum stress of a bonded honeycomb segment assembly in the fluid passage direction of Comparative Example 4. In Examples 25 to 30, the ratios were calculated on the basis of the maximum stress of a bonded honeycomb segment assembly in the fluid passage direction of Comparative Example 5. In Examples 31 to 36, the ratios were calculated on the basis of the maximum stress of a bonded honeycomb segment assembly in the fluid passage direction of Comparative Example 6.

Example 1

Outer walls of 16 honeycomb segments each having a sectional shape of a square with each side of about 36 mm and having a length of about 254 mm were bonded to one another by use of bonding material slurries having different Young's modulus values so as to obtain a ratio $M_2/M_1$ of 1.01 of an average value $M_2$ of compressive Young's modulus values of the thickness direction of an outer peripheral bonding layer in the fluid passage direction with respect to an average value $M_1$ of compressive Young's modulus values of the thickness direction of a bonding layer in the vicinity of a gravity point in the fluid passage direction. An external pressure was added to the bonded honeycomb segments, followed by drying at 140° C. for two hours, thereby obtaining a laminated honeycomb article. After cutting the outer periphery of this laminated honeycomb article into a cylindrical shape, the article was coated with an outer peripheral coat material, and dried to harden at 700° C. for two hours, to manufacture a bonded honeycomb segment assembly having an outer diameter of about 144 mm, a length of about 254 mm and a cross section shown in FIG. 2A. A soot regeneration test was performed by using the manufactured bonded honeycomb segment assembly on conditions that a soot amount was 8.1 g/L. The evaluation of the presence/absence of cracking was "absent", the maximum stress of the bonded honeycomb segment assembly in the fluid passage direction was 19 MPa and a stress decrease ratio was 5%. It is to be noted that in the honeycomb segments, a silicon-silicon carbide based composite material having a porosity of 52% and a bending strength of 20 MPa was used. Moreover, the average value $M_1$ of the compressive Young's modulus values of the thickness direction of the bonding layer in the vicinity of the gravity point in the fluid passage direction was 20.0 MPa, and the average value $M_2$ of the compressive Young's modulus values of the thickness direction of the outer peripheral bonding layer in the fluid passage direction was 20.2 MPa.

Examples 2 to 6 and Comparative Example 1

Bonded honeycomb segment assemblies were manufactured in the same manner as in Example 1 except that honeycomb segments were bonded by using bonding material slurries having different Young's modulus values so that a ratio $M_2/M_1$ of an average value $M_2$ of compressive Young's modulus values of the thickness direction of an outer peripheral bonding layer in the fluid passage direction with respect to an average value $M_1$ of compressive Young's modulus values of the thickness direction of a bonding layer in the vicinity of a gravity point in the fluid passage direction indicated a value described in Table 1 and except that the conditions of a soot amount were set to those described in Table 1 in a soot regeneration test.

TABLE 1

| | $M_1$ | $M_2$ | $M_2/M_1$ | Soot amount (g/L) | Stress decrease ratio (%) | Maximum stress (MPa) | Presence/absence of cracking |
|---|---|---|---|---|---|---|---|
| Example 1 | 20 | 20.2 | 1.01 | 8.1 | 5 | 19 | Absent |
| Example 2 | 20 | 21 | 1.05 | 8.0 | 15 | 17 | Absent |
| Example 3 | 20 | 22 | 1.1 | 8.2 | 20 | 16 | Absent |
| Example 4 | 20 | 40 | 2 | 8.1 | 20 | 16 | Absent |
| Example 5 | 20 | 100 | 5 | 7.9 | 25 | 15 | Absent |
| Example 6 | 20 | 1000 | 50 | 8.1 | 25 | 15 | Absent |
| Comparative Example 1 | 20 | 20 | 1 | 8.1 | — | 20 | Present |

It is seen from Table 1 that when a ratio $M_2/M_1$ of an average value $M_2$ of compressive Young's modulus values of the thickness direction of an outer peripheral bonding layer in the fluid passage direction with respect to an average value $M_1$ of compressive Young's modulus values of the thickness direction of a bonding layer in the vicinity of a gravity point in the fluid passage direction is set to 1.01 or more, a stress can be decreased, and the thermal shock resistance of the bonded honeycomb segment assembly can be improved. Especially, it is seen from the result of Example 3 that when $M_2/M_1$ is set to 1.1 or more, this effect becomes remarkable.

Example 7

Outer walls of 16 honeycomb segments each having a sectional shape of a square with each side of about 36 mm and having a length of about 254 mm were bonded to one another by use of bonding material slurries having different Young's modulus values so as to obtain a ratio $M_2/M_1$ of 1.01 of an average value $M_2$ of compressive Young's modulus values of the thickness direction of an outer peripheral bonding layer in the fluid passage direction with respect to an average value $M_1$ of compressive Young's modulus values of the thickness direction of a bonding layer in the vicinity of a gravity point in the fluid passage direction. An external pressure was added to the bonded honeycomb segments, followed by drying at 140° C. for two hours, thereby obtaining a laminated honeycomb article. After cutting the outer periphery of this laminated honeycomb article into a cylindrical shape, the article was coated with an outer peripheral coat material, and dried to harden at 700° C. for two hours, to manufacture a bonded honeycomb segment assembly having an outer diameter of about 144 mm, a length of about 254 mm and a cross section shown in FIG. 2A. A soot regeneration test was performed by using the manufactured bonded honeycomb segment assembly on conditions that a soot amount was 10.1 g/L. The evaluation of the presence/absence of cracking was "absent", the maximum stress of the bonded honeycomb segment assembly in the fluid passage direction was 44 MPa and a stress decrease ratio was 4%. It is to be noted that in the honeycomb segments, a silicon-silicon carbide based composite material having a porosity of 41% and a bending strength of 45 MPa was used. Moreover, the average value $M_1$ of the compressive Young's modulus values of the thickness direction of the bonding layer in the vicinity of the gravity point in the fluid passage direction was 20.0 MPa, and the average value $M_2$ of the compressive Young's modulus values of the thickness direction of the outer peripheral bonding layer in the fluid passage direction was 20.2 MPa.

Examples 8 to 12 and Comparative Example 2

Bonded honeycomb segment assemblies were manufactured in the same manner as in Example 7 except that honeycomb segments were bonded by using bonding material slurries having different Young's modulus values so that a ratio $M_2/M_1$ of an average value $M_2$ of compressive Young's modulus values of the thickness direction of an outer peripheral bonding layer in the fluid passage direction with respect to an average value $M_1$ of compressive Young's modulus values of the thickness direction of a bonding layer in the vicinity of a gravity point in the fluid passage direction indicated a value described in Table 2 and except that the conditions of a soot amount were set to those described in Table 2 in a soot regeneration test.

TABLE 2

|  | $M_1$ | $M_2$ | $M_2/M_1$ | Soot amount (g/L) | Stress decrease ratio (%) | Maximum stress (MPa) | Presence/ absence of cracking |
|---|---|---|---|---|---|---|---|
| Example 7 | 20 | 20.2 | 1.01 | 10.1 | 4 | 44 | Absent |
| Example 8 | 20 | 21 | 1.05 | 10.2 | 9 | 42 | Absent |
| Example 9 | 20 | 22 | 1.1 | 10.1 | 20 | 37 | Absent |
| Example 10 | 20 | 40 | 2 | 10.0 | 20 | 37 | Absent |
| Example 11 | 20 | 100 | 5 | 9.9 | 22 | 36 | Absent |
| Example 12 | 20 | 1000 | 50 | 10.2 | 24 | 35 | Absent |
| Comparative Example 2 | 20 | 20 | 1 | 10.1 | — | 46 | Present |

It is seen from Table 2 that when a ratio $M_2/M_1$ of an average value $M_2$ of compressive Young's modulus values of the thickness direction of an outer peripheral bonding layer in the fluid passage direction with respect to an average value $M_1$ of compressive Young's modulus values of the thickness direction of a bonding layer in the vicinity of a gravity point in the fluid passage direction is set to 1.01 or more, a stress can be decreased, and the thermal shock resistance of the bonded honeycomb segment assembly can be improved. Especially, it is seen from the result of Example 9 that when $M_2/M_1$ is set to 1.1 or more, this effect becomes remarkable.

Example 13

Outer walls of 16 honeycomb segments each having a sectional shape of a square with each side of about 36 mm and having a length of about 254 mm were bonded to one another by use of bonding material slurries having different Young's modulus values so as to obtain a ratio $M_2/M_1$ of 1.01 of an average value $M_2$ of compressive Young's modulus values of the thickness direction of an outer peripheral bonding layer in the fluid passage direction with respect to an average value $M_1$ of compressive Young's modulus values of the thickness direction of a bonding layer in the vicinity of a gravity point in the fluid passage direction. An external pressure was added to the bonded honeycomb segments, followed by drying at 140° C. for two hours, thereby obtaining a laminated honeycomb article. After cutting the outer periphery of this laminated honeycomb article into a cylindrical shape, the article was coated with an outer peripheral coat material, and dried to harden at 700° C. for two hours, to manufacture a bonded honeycomb segment assembly having an outer diameter of about 144 mm, a length of about 254 mm and a cross section shown in FIG. 2A. A soot regeneration test was performed by using the manufactured bonded honeycomb segment assembly on conditions that a soot amount was 7.2 g/L. The evaluation of the presence/absence of cracking was "absent", the maximum stress of the bonded honeycomb segment assembly in the fluid passage direction was 15 MPa and a stress decrease ratio was 6%. It is to be noted that in the honeycomb segments, a silicon-silicon carbide based composite material having a porosity of 58% and a bending strength of 17 MPa was used. Moreover, the average value $M_1$ of the compressive Young's modulus values of the thickness direction of the bonding layer in the vicinity of the gravity point in the fluid passage direction was 20.0 MPa, and the average value $M_2$ of the compressive Young's modulus values of the thickness direction of the outer peripheral bonding layer in the fluid passage direction was 20.2 MPa.

Examples 14 to 18 and Comparative Example 3

Bonded honeycomb segment assemblies were manufactured in the same manner as in Example 13 except that honeycomb segments were bonded by using bonding material slurries having different Young's modulus values so that a ratio $M_2/M_1$ of an average value $M_2$ of compressive Young's modulus values of the thickness direction of an outer peripheral bonding layer in the fluid passage direction with respect to an average value $M_1$ of compressive Young's modulus values of the thickness direction of a bonding layer in the vicinity of a gravity point in the fluid passage direction indicated a value described in Table 3 and except that the conditions of a soot amount were set to those described in Table 3 in a soot regeneration test.

TABLE 3

| | $M_1$ | $M_2$ | $M_2/M_1$ | Soot amount (g/L) | Stress decrease ratio (%) | Maximum stress (MPa) | Presence/absence of cracking |
|---|---|---|---|---|---|---|---|
| Example 13 | 20 | 20.2 | 1.01 | 7.2 | 6 | 15 | Absent |
| Example 14 | 20 | 21 | 1.05 | 7.3 | 19 | 13 | Absent |
| Example 15 | 20 | 22 | 1.1 | 7.0 | 25 | 12 | Absent |
| Example 16 | 20 | 40 | 2 | 7.2 | 25 | 12 | Absent |
| Example 17 | 20 | 100 | 5 | 7.3 | 25 | 12 | Absent |
| Example 18 | 20 | 1000 | 50 | 7.0 | 31 | 11 | Absent |
| Comparative Example 3 | 20 | 20 | 1 | 7.1 | — | 16 | Present |

It is seen from Table 3 that when a ratio $M_2/M_1$ of an average value $M_2$ of compressive Young's modulus values of the thickness direction of an outer peripheral bonding layer in the fluid passage direction with respect to an average value $M_1$ of compressive Young's modulus values of the thickness direction of a bonding layer in the vicinity of a gravity point in the fluid passage direction is set to 1.01 or more, a stress can be decreased, and the thermal shock resistance of the bonded honeycomb segment assembly can be improved. Especially, it is seen from the result of Example 15 that when $M_2/M_1$ is set to 1.1 or more, this effect becomes remarkable.

Example 19

Outer walls of 16 honeycomb segments each having a sectional shape of a square with each side of about 36 mm and having a length of about 254 mm were bonded to one another by use of bonding material slurries having different Young's modulus values so as to obtain a ratio $M_2/M_1$ of 1.01 of an average value $M_2$ of compressive Young's modulus values of the thickness direction of an outer peripheral bonding layer in the fluid passage direction with respect to an average value $M_1$ of compressive Young's modulus values of the thickness direction of a bonding layer in the vicinity of a gravity point in the fluid passage direction. An external pressure was added to the bonded honeycomb segments, followed by drying at 140° C. for two hours, thereby obtaining a laminated honeycomb article. After cutting the outer periphery of this laminated honeycomb article into a cylindrical shape, the article was coated with an outer peripheral coat material, and dried to harden at 700° C. for two hours, to manufacture a bonded honeycomb segment assembly having an outer diameter of about 144 mm, a length of about 254 mm and a cross section shown in FIG. 2A. A soot regeneration test was performed by using the manufactured bonded honeycomb segment assembly on conditions that a soot amount was 9.9 g/L. The evaluation of the presence/absence of cracking was "absent", the maximum stress of the bonded honeycomb segment assembly in the fluid passage direction was 41 MPa and a stress decrease ratio was 5%. It is to be noted that in the honeycomb segments, a silicon-silicon carbide based composite material having a porosity of 43% and a bending strength of 44 MPa was used. Moreover, the average value $M_1$ of the compressive Young's modulus values of the thickness direction of the bonding layer in the vicinity of the gravity point in the fluid passage direction was 20.0 MPa, and the average value $M_2$ of the compressive Young's modulus values of the thickness direction of the outer peripheral bonding layer in the fluid passage direction was 20.2 MPa.

Examples 20 to 24 and Comparative Example 4

Bonded honeycomb segment assemblies were manufactured in the same manner as in Example 19 except that honeycomb segments were bonded by using bonding material slurries having different Young's modulus values so that a ratio $M_2/M_1$ of an average value $M_2$ of compressive Young's modulus values of the thickness direction of an outer peripheral bonding layer in the fluid passage direction with respect to an average value $M_1$ of compressive Young's modulus values of the thickness direction of a bonding layer in the vicinity of a gravity point in the fluid passage direction indicated a value described in Table 4 and except that the conditions of a soot amount were set to those described in Table 4 in a soot regeneration test.

TABLE 4

| | $M_1$ | $M_2$ | $M_2/M_1$ | Soot amount (g/L) | Stress decrease ratio (%) | Maximum stress (MPa) | Presence/absence of cracking |
|---|---|---|---|---|---|---|---|
| Example 19 | 20 | 20.2 | 1.01 | 9.9 | 5 | 41 | Absent |
| Example 20 | 20 | 21 | 1.05 | 10 | 12 | 38 | Absent |
| Example 21 | 20 | 22 | 1.1 | 10.1 | 19 | 35 | Absent |
| Example 22 | 20 | 40 | 2 | 10.1 | 21 | 34 | Absent |
| Example 23 | 20 | 100 | 5 | 10 | 21 | 34 | Absent |
| Example 24 | 20 | 1000 | 50 | 10.2 | 23 | 33 | Absent |
| Comparative Example 4 | 20 | 20 | 1 | 10.1 | — | 43 | Present |

It is seen from Table 4 that when a ratio $M_2/M_1$ of an average value $M_2$ of compressive Young's modulus values of the thickness direction of an outer peripheral bonding layer in the fluid passage direction with respect to an average value $M_1$ of compressive Young's modulus values of the thickness direction of a bonding layer in the vicinity of a gravity point in the fluid passage direction is set to 1.01 or more, a stress can be decreased, and the thermal shock resistance of the bonded honeycomb segment assembly can be improved. Especially, it is seen from the result of Example 21 that when $M_2/M_1$ is set to 1.1 or more, this effect becomes remarkable.

Example 25

Outer walls of 49 honeycomb segments each having a sectional shape of a square with each side of about 36 mm and having a length of about 305 mm were bonded to one another by use of bonding material slurries having different Young's modulus values so as to obtain a ratio $M_2/M_1$ of 1.01 of an average value $M_2$ of compressive Young's modulus values of the thickness direction of an outer peripheral bonding layer in the fluid passage direction with respect to an average value $M_1$ of compressive Young's modulus values of the thickness direction of a bonding layer in the vicinity of a gravity point in the fluid passage direction. An external pressure was added to the bonded honeycomb segments, followed by drying at 140° C. for two hours, thereby obtaining a laminated honeycomb article. After cutting the outer periphery of this laminated honeycomb article into a cylindrical shape, the article was coated with an outer peripheral coat material, and dried to harden at 700° C. for two hours, to manufacture a bonded honeycomb segment assembly having an outer diameter of about 229 mm, a length of about 305 mm and a cross section shown in FIG. 2B. A soot regeneration test was performed by using the manufactured bonded honeycomb segment assembly on conditions that a soot amount was 8.2 g/L. The evaluation of the presence/absence of cracking was "absent", the maximum stress of the bonded honeycomb segment assembly in the fluid passage direction was 20 MPa and a stress decrease ratio was 5%. It is to be noted that in the honeycomb segments, a silicon-silicon carbide based composite material having a porosity of 52% and a bending strength of 20 MPa was used. Moreover, the average value $M_1$ of the compressive Young's modulus values of the thickness direction of the bonding layer in the vicinity of the gravity point in the fluid passage direction was 20.0 MPa, and the average value $M_2$ of the compressive Young's modulus values of the thickness direction of the outer peripheral bonding layer in the fluid passage direction was 20.2 MPa.

Examples 26 to 30 and Comparative Example 5

Bonded honeycomb segment assemblies were manufactured in the same manner as in Example 25 except that honeycomb segments were bonded by using bonding material slurries having different Young's modulus values so that a ratio $M_2/M_1$ of an average value $M_2$ of compressive Young's modulus values of the thickness direction of an outer peripheral bonding layer in the fluid passage direction with respect to an average value $M_1$ of compressive Young's modulus values of the thickness direction of a bonding layer in the vicinity of a gravity point in the fluid passage direction indicated a value described in Table 5 and except that the conditions of a soot amount were set to those described in Table 5 in a soot regeneration test.

It is seen from Table 5 that when a ratio $M_2/M_1$ of an average value $M_2$ of compressive Young's modulus values of the thickness direction of an outer peripheral bonding layer in the fluid passage direction with respect to an average value $M_1$ of compressive Young's modulus values of the thickness direction of a bonding layer in the vicinity of a gravity point in the fluid passage direction is set to 1.01 or more, a stress can be decreased, and the thermal shock resistance of the bonded honeycomb segment assembly can be improved. Especially, it is seen from the result of Example 27 that when $M_2/M_1$ is set to 1.1 or more, this effect becomes remarkable.

Example 31

Outer walls of 28 honeycomb segments each having a sectional shape of a square with each side of about 36 mm and having a length of about 305 mm were bonded to one another by use of bonding material slurries having different Young's modulus values so as to obtain a ratio $M_2/M_1$ of 1.01 of an average value $M_2$ of compressive Young's modulus values of the thickness direction of an outer peripheral bonding layer in the fluid passage direction with respect to an average value $M_1$ of compressive Young's modulus values of the thickness direction of a bonding layer in the vicinity of a gravity point in the fluid passage direction. An external pressure was added to the bonded honeycomb segments, followed by drying at 140° C. for two hours, thereby obtaining a laminated honeycomb article. After cutting the outer periphery of this laminated honeycomb article, the article was coated with an outer peripheral coat material, and dried to harden at 700° C. for two hours, to manufacture a bonded honeycomb segment assembly having a length of about 305 mm and a cross section shown in FIG. 2C. A soot regeneration test was performed by using the manufactured bonded honeycomb segment assembly on conditions that a soot amount was 6.0 g/L. The evaluation of the presence/absence of cracking was "absent", the maximum stress of the bonded honeycomb segment assembly in the fluid passage direction was 18 MPa and a stress decrease ratio was 5%. It is to be noted that in the honeycomb segments, a silicon-silicon carbide based composite material having a porosity of 52% and a bending strength of 20 MPa was used. Moreover, the average value $M_1$ of the compressive Young's modulus values of the thickness direction of the bonding layer in the vicinity of the gravity point in the fluid passage direction was 20.0 MPa, and the average value $M_2$ of the compressive Young's modulus values of the thickness direction of the outer peripheral bonding layer in the fluid passage direction was 20.2 MPa.

TABLE 5

| | $M_1$ | $M_2$ | $M_2/M_1$ | Soot amount (g/L) | Stress decrease ratio (%) | Maximum stress (MPa) | Presence/ absence of cracking |
|---|---|---|---|---|---|---|---|
| Example 25 | 20 | 20.2 | 1.01 | 8.2 | 5 | 20 | Absent |
| Example 26 | 20 | 21 | 1.05 | 8.1 | 19 | 17 | Absent |
| Example 27 | 20 | 22 | 1.1 | 8.3 | 24 | 16 | Absent |
| Example 28 | 20 | 40 | 2 | 8.3 | 24 | 16 | Absent |
| Example 29 | 20 | 100 | 5 | 8.2 | 29 | 15 | Absent |
| Example 30 | 20 | 1000 | 50 | 8.3 | 29 | 15 | Absent |
| Comparative Example 5 | 20 | 20 | 1 | 8.1 | — | 21 | Present |

Examples 32 to 36 and Comparative Example 6

Bonded honeycomb segment assemblies were manufactured in the same manner as in Example 31 except that honeycomb segments were bonded by using bonding material slurries having different Young's modulus values so that a ratio $M_2/M_1$ of an average value $M_2$ of compressive Young's modulus values of the thickness direction of an outer peripheral bonding layer in the fluid passage direction with respect to an average value $M_1$ of compressive Young's modulus values of the thickness direction of a bonding layer in the vicinity of a gravity point in the fluid passage direction indicated a value described in Table 6 and except that the conditions of a soot amount were set to those described in Table 6 in a soot regeneration test.

TABLE 6

| | $M_1$ | $M_2$ | $M_2/M_1$ | Soot amount (g/L) | Stress decrease ratio (%) | Maximum stress (MPa) | Presence/absence of cracking |
|---|---|---|---|---|---|---|---|
| Example 31 | 20 | 20.2 | 1.01 | 6.0 | 5 | 18 | Absent |
| Example 32 | 20 | 21 | 1.05 | 6.1 | 11 | 17 | Absent |
| Example 33 | 20 | 22 | 1.1 | 6.0 | 21 | 15 | Absent |
| Example 34 | 20 | 40 | 2 | 6.1 | 26 | 14 | Absent |
| Example 35 | 20 | 100 | 5 | 6.3 | 26 | 14 | Absent |
| Example 36 | 20 | 1000 | 50 | 6.1 | 26 | 14 | Absent |
| Comparative Example 6 | 20 | 20 | 1 | 6.2 | — | 19 | Present |

It is seen from Table 6 that when a ratio $M_2/M_1$ of an average value $M_2$ of compressive Young's modulus values of the thickness direction of an outer peripheral bonding layer in the fluid passage direction with respect to an average value $M_1$ of compressive Young's modulus values of the thickness direction of a bonding layer in the vicinity of a gravity point in the fluid passage direction is set to 1.01 or more, a stress can be decreased, and the thermal shock resistance of the bonded honeycomb segment assembly can be improved. Especially, it is seen from the result of Example 33 that when $M_2/M_1$ is set to 1.1 or more, this effect becomes remarkable.

The bonded honeycomb segment assembly of the present invention can be utilized to remove a particulate material in an exhaust gas from the exhaust gas discharged from an internal combustion engine such as an engine for a car, an engine for a construction machine, or a stational engine for an industrial machine, another combustion device or the like.

DESCRIPTION OF REFERENCE NUMERALS

1: bonded honeycomb segment assembly, 2, 12 and 22: honeycomb segment, 3, 13 and 23: cross section, 5: cell, 6: partition wall, 7: plugging portion, 8: outer wall, 9: bonding layer, 9a, 19a and 29a: bonding layer positioned in the vicinity of gravity point in cross section perpendicular to cell fluid passage direction, 9b, 19b and 29b: bonding layer for bonding outer walls of honeycomb segments positioned in outermost periphery, and G: gravity point.

What is claimed is:

1. A bonded honeycomb segment assembly comprising: a plurality of honeycomb segments each including a cell structure having a plurality of cells as fluid passages partitioned by porous partition walls and provided in parallel with one another, and an outer wall provided in the outer periphery of the cell structure,
    wherein the outer wall of each of the plurality of honeycomb segments is bonded to one another via bonding layers, and
    a compressive Young's modulus $M_1$ in the thickness direction of the bonding layers positioned in the vicinity of a center of gravity n a cross section of the bonded honeycomb segment assembly perpendicular to the fluid passage direction of the cells, and a compressive Young's modulus $M_2$ in the thickness direction of the bonding layers bonding the outer wall of each of the plurality of honeycomb segments positioned in the outermost periphery of the bonded honeycomb segment assembly satisfy a relation of $M_1<M_2$,
    wherein the compressive Young's Modulus $M_2$ is at least 20 MPa and not more than 40 MPa.

2. The bonded honeycomb segment assembly according to claim 1, wherein the compressive Young's modulus $M_1$ and the compressive Young's modulus $M_2$ satisfy a relation of $M_2/M_1 \geq 1.01$.

3. The bonded honeycomb segment assembly according to claim 1, wherein the compressive Young's modulus $M_1$ and the compressive Young's modulus $M_2$ satisfy a relation of $M_2/M_1 \geq 1.1$.

* * * * *